UNITED STATES PATENT OFFICE.

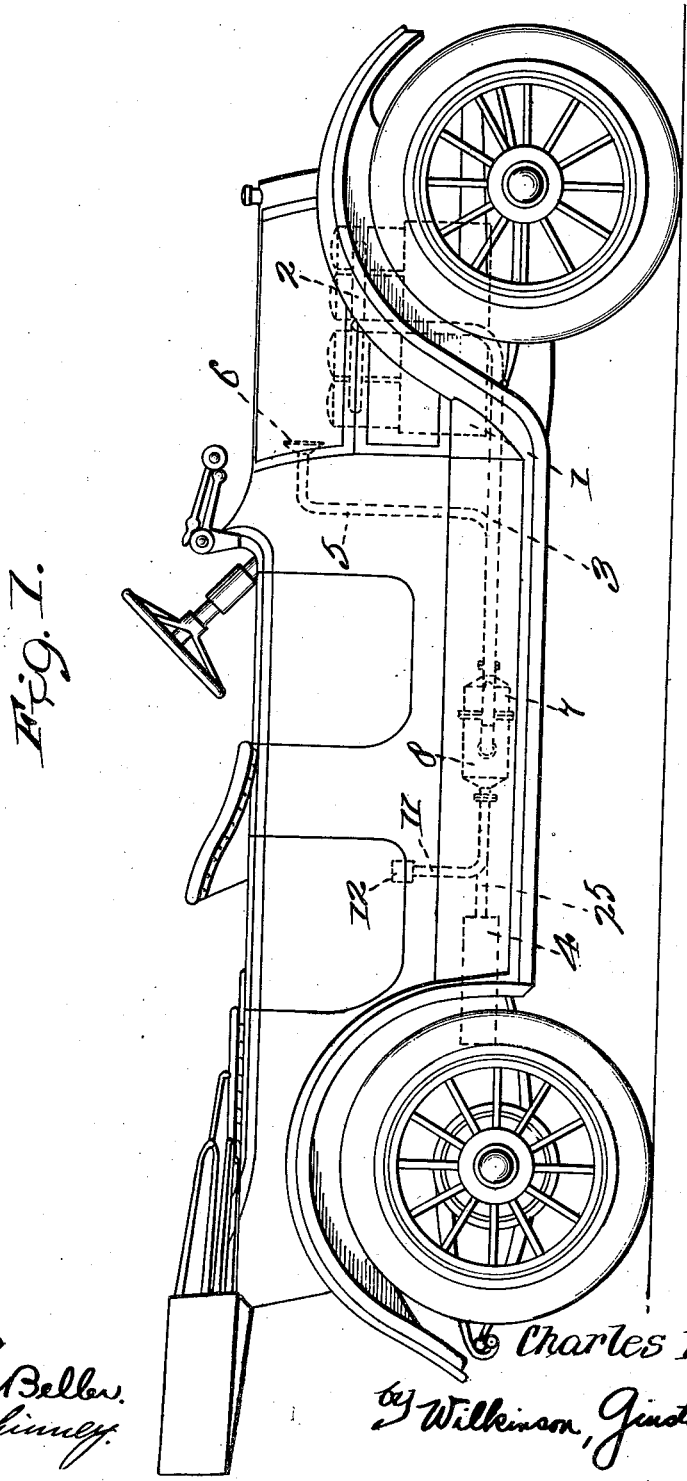

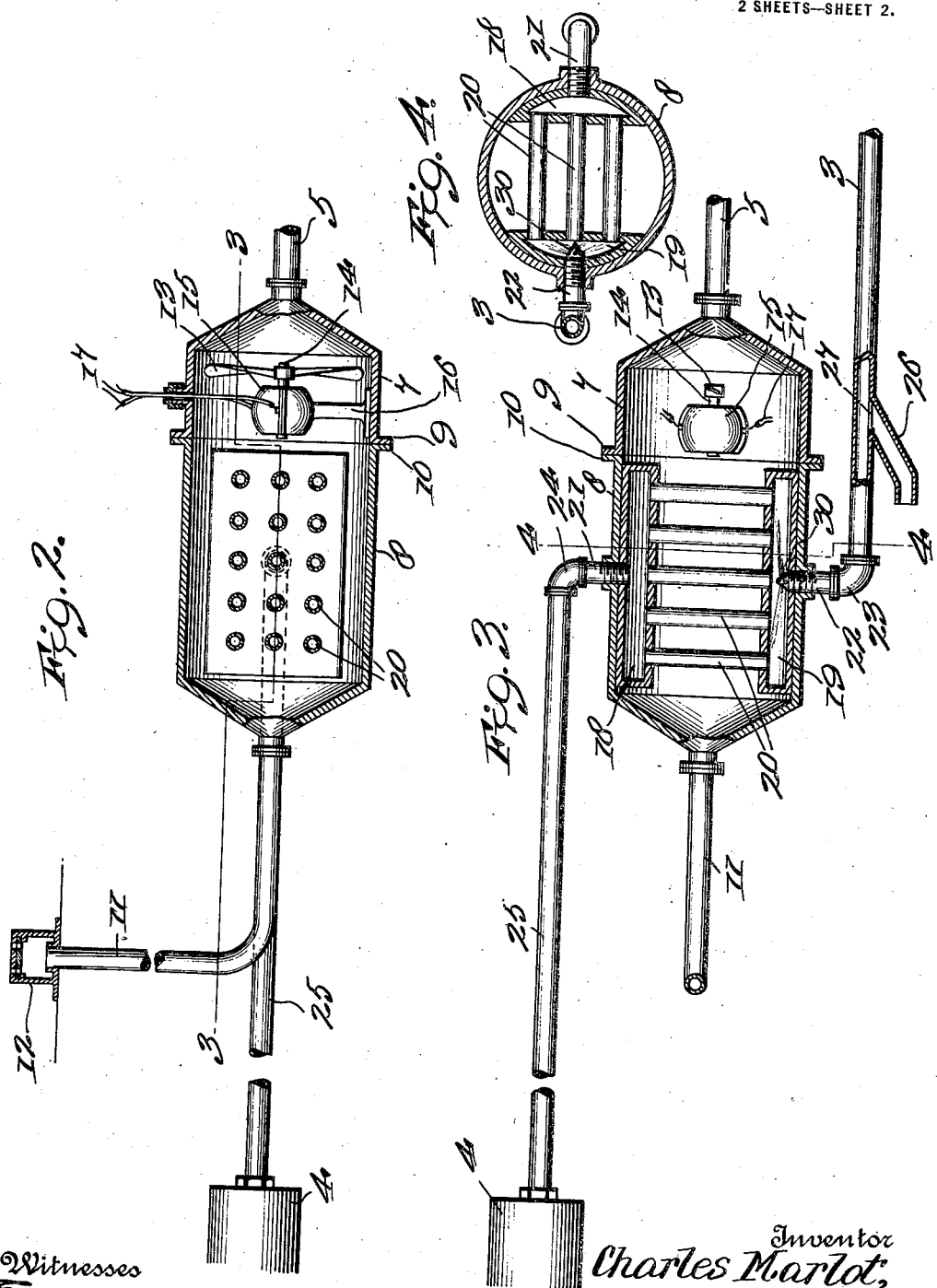

CHARLES MARLOT, OF AKRON, OHIO.

HEATING SYSTEM FOR AUTOMOBILES.

1,200,745.   Specification of Letters Patent.   Patented Oct. 10, 1916.

Application filed February 7, 1916. Serial No. 76,855.

*To all whom it may concern:*

Be it known that I, CHARLES MARLOT, a citizen of the United States, residing at Akron, in the county of Summit and State of Ohio, have invented certain new and useful Improvements in Heating Systems for Automobiles; and I do hereby declare the following to be a full, clear, and exact description of the invention, such as will enable others skilled in the art to which it appertains to make and use the same.

The present invention relates to improvements in heating systems for automobiles in which the air that has become heated by contact and circulation about the engine cylinders beneath the hood is collected and conveyed to the tonneau or other location in the vehicle, and there liberated under the control of a suitable register.

An object of the present invention resides in including in the conduit, carrying the air from the hood to the tonneau, a casing or housing provided with a circulating device, such as an electric or other fan, for insuring the delivery of heated air in quantities to the register; and which casing also embodies a radiator, included in the engine exhaust, for imparting to the air circulating through the casing a higher degree of heat.

With these and other objects in view the invention consists in the novel details of construction and combinations of parts more fully hereinafter disclosed and particularly pointed out in the claims.

In the accompanying drawings forming a part of this application, and in which similar reference symbols indicate corresponding parts in the several views: Figure 1 is a side elevational view of an automobile illustrated as equipped with a heating system constructed in accordance with the present invention. Fig. 2 is an enlarged vertical sectional view of the housing and connections. Fig. 3 is a horizontal sectional view through the housing taken on the line 3—3 in Fig. 2; and Fig. 4 is a transverse sectional view taken on the line 4—4 in Fig. 3.

Referring now more particularly to the drawings, wherein one embodiment of the present invention is illustrated, in Fig. 1 is indicated an automobile, in which is installed an engine designated generally at 1. The cylinders of the engine 1 are in the usual manner connected to a manifold 2, and to the manifold 2 is coupled an exhaust pipe 3 leading to a muffler 4 at the rear of the vehicle.

At 5 is indicate a pipe, the forward end of which terminates in a flaring or bell-shaped mouth 6, disposed immediately forward of the vehicle dash-board, and at the rear of the space within the engine hood, preferably at a slight elevation above the cylinders. This pipe 5 leads to one end of the forward section 7 of a casing or housing, located beneath the vehicle, and including a second rear section 8; the sections being formed with flanges 9 and 10, respectively, through which suitable securing means may be passed for assembling the casing sections together. To the rear of the casing section 8 is coupled a pipe 11 in connection at its opposite end with a register 12, shown in Fig. 1 to be situated in the floor of the tonneau, but which will be placed in any other location in the vehicle desirable.

As disclosed to advantage in Figs. 2 and 3, in the forward casing section 7 is mounted a fan 13 on the shaft 14 of an electric or other motor 15, the same being supported on a bracket 16 and supplied with current through leads 17 connected in the storage battery or other circuit.

In the rear section 8 of the casing is removably fitted a radiator, shown more particularly in Figs. 3 and 4 to include a pair of spaced headers 18 and 19, connected by series of tubes 20. As seen in Fig. 4, the casing is preferably of cylindrical form, though not necessarily so, and in such case the outer walls of the headers 18 and 19 are curved to conform to the inner walls of the casing section 8, they being held therein in any suitable manner, as, for instance, by threaded sections of pipe 21 and 22 passing through the casing walls and the outer curved walls of said headers.

It will be understood that by removing the fastening means on the flanges 9 and 10, the sections 7 and 8 of the casing may be readily separated; and by unscrewing the pipe sections 21 and 22 the radiator, including the headers 18 and 19 and the tubes 20, may, as a unit, be withdrawn from the casing section 8 and cleaned, repaired, or substituted by a new radiator.

The exhaust pipe 3 is connected through an elbow 23 with the threaded pipe section 22 for delivering the exhaust gases therethrough and into the header 19, from which the same circulate through the several tubes 20 to the opposite header 18 and are discharged therefrom through the pipe section 21, and elbow 24 and a pipe 25 forming the continuation of the exhaust pipe and communicating with the muffler 4, as shown.

In the exhaust pipe 3 is included a cut-out 26, under the control of a valve 27, which may be connected to operating means convenient to the hand of the driver, and which may be used for the same purpose, as cut-outs are ordinarily employed to divert the exhaust from the muffler when greater power is required. The circuit for the circulating fan 13 is also preferably under the direct control of the driver of the vehicle, so as to cut down the supply of heated air as occasion demands. This regulation of the supply of heated air will also be understood to be under the control of the register 12.

In some instances it may be preferable to secure a conical perforated nozzle or spreader 30 to the pipe section 22 and extending into the header 19 for directing the exhaust gases, as indicated in Figs. 3 and 4, to all parts of said header, and in order to cause a good circulation of such gases to all of the tubes 20 of the radiator.

It will be appreciated that although I have shown and described a radiator including headers 18 and 19 and tubes 20, this construction may be substituted by a coil or series of coils through which the exhaust gases may pass on their way to the muffler, and be effective to raise the temperature of the air passing through the casing. Similarly, various other modifications will suggest themselves to those skilled in the art, and I do not wish to be restricted to the details of construction herein shown and described except as may be required by the appended claims.

I claim:

1. The combination with an automobile, of a conduit mounted thereon and having its forward end in open communication with the upper rear portion of the space within the hood for receiving the heated air therein, a register in the vehicle in connection with said conduit, an enlarged casing included in said conduit, a radiator removably fitted in said casing and including a pair of headers and tubes connected between said headers, and connections placing said radiator in communication with the exhaust flue, substantially as described.

2. The combination with an automobile, of a conduit mounted thereon and having its forward end in open communication with the upper rear portion of the space within the hood, a register in the vehicle in connection with said conduit, an enlarged casing included in said conduit, a circulating fan mounted in said casing, means in said casing for actuating said circulating fan, a removable radiator fitted in said casing and including headers and tubes connecting said headers, connections placing said radiator in the exhaust flue of the automobile engine, and a spreader in the intake header for distributing the exhaust gases throughout the radiator, substantially as described.

In testimony whereof, I affix my signature.

CHARLES MARLOT.